(12) United States Patent
Kim (10) Patent No.: US 11,457,069 B2
(45) Date of Patent: Sep. 27, 2022

(54) TELEMATICS SERVICE SYSTEM AND METHOD

(71) Applicants: Hyundai Motor Company, Seoul (KR); Kia Motors Corporation, Seoul (KR)

(72) Inventor: Joon Young Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 144 days.

(21) Appl. No.: 16/664,108

(22) Filed: Oct. 25, 2019

(65) Prior Publication Data

US 2021/0014309 A1    Jan. 14, 2021

(30) Foreign Application Priority Data

Jul. 9, 2019    (KR) .......................... 10-2019-0082653

(51) Int. Cl.
| H04L 67/12 | (2022.01) |
| H04L 12/66 | (2006.01) |
| G07C 5/02 | (2006.01) |
| G07C 5/00 | (2006.01) |
| G07C 5/08 | (2006.01) |
| H04W 4/40 | (2018.01) |
| H04L 12/40 | (2006.01) |

(52) U.S. Cl.
CPC ............. *H04L 67/12* (2013.01); *G07C 5/008* (2013.01); *G07C 5/02* (2013.01); *G07C 5/085* (2013.01); *G07C 5/0808* (2013.01); *H04L 12/40* (2013.01); *H04L 12/66* (2013.01); *H04W 4/40* (2018.02); *H04L 2012/40273* (2013.01)

(58) Field of Classification Search
CPC .......... H04L 67/12; H04W 4/40; G07C 5/008; G07C 5/02; G07C 5/0808
See application file for complete search history.

(56) References Cited

U.S. PATENT DOCUMENTS

| 2002/0071388 | A1* | 6/2002 | Bergsson | ................ H04L 47/12 370/235 |
| 2007/0082679 | A1* | 4/2007 | Kim | ....................... G01C 21/26 701/1 |
| 2008/0235517 | A1* | 9/2008 | Ohmori | ................. H04L 9/0891 713/187 |
| 2009/0077267 | A1* | 3/2009 | Alrabady | .............. H04L 67/025 709/249 |
| 2011/0208386 | A1* | 8/2011 | Jiang | ...................... G07C 5/008 701/31.4 |

(Continued)

*Primary Examiner* — William G Trost, IV
*Assistant Examiner* — Monishwar Mohan
(74) *Attorney, Agent, or Firm* — Morgan, Lewis & Bockius LLP (57) ABSTRACT

A telematics service system includes a telematics server connected to a service providing server and a telematics gateway over a network. The telematics server is configured to transmit or receive data to or from a vehicle through the telematics gateway, to select a recommendation protocol capable of being used to transmit or receive the data based on at least one of a type of the data flowing in from the service providing server or a throughput rate, and to determine a final protocol of the recommendation protocol through a handshake with the vehicle.

20 Claims, 9 Drawing Sheets

(56) References Cited

U.S. PATENT DOCUMENTS

| | | | |
|---|---|---|---|
| 2013/0013347 A1* | 1/2013 | Ling | G06Q 10/0833 |
| | | | 705/4 |
| 2018/0176814 A1* | 6/2018 | Fujita | H04W 76/10 |
| 2018/0192350 A1* | 7/2018 | Kim | H04W 40/12 |
| 2018/0255117 A1* | 9/2018 | Ljung | H04L 65/80 |
| 2019/0208443 A1* | 7/2019 | Pal | H04W 64/00 |
| 2020/0004605 A1* | 1/2020 | Kim | B60R 16/02 |
| 2020/0213287 A1* | 7/2020 | Zhang | H04L 63/064 |

* cited by examiner

TELEMATICS SERVICE SYSTEM AND METHOD

CROSS-REFERENCE TO RELATED APPLICATION

This application claims the benefit of priority to Korean Patent Application No. 10-2019-0082653, filed in the Korean Intellectual Property Office on Jul. 9, 2019, the entire contents of which are incorporated herein by reference.

TECHNICAL FIELD

The present disclosure relates to a telematics service system and method.

BACKGROUND

A telematics technology is a combination of telecommunication and informatics and is defined as a service that provides a vehicle and a driver with various pieces of information such as traffic guidance, emergency rescue, remote vehicle diagnosis, Internet, and a mobile office function, using an in-vehicle terminal through the locating technology and a two-way mobile communication network. The telematics is directed to fuse Information Technology (IT) such as a terminal platform, Global Positioning System (GPS), mobile communication, traffic information, and Geographic Information System (GIS), to create a new added value by applying the fused technology to the vehicle, and to provide an in-vehicle multimedia service environment linked to a home network.

Because the existing telematics is dedicated to only one protocol during communication between a server and the vehicle due to a vehicle security problem, there is a problem in the link of various services and each service needs to be applied variously. In particular, there is a problem in the streaming or data transmission in a push form using one protocol method.

SUMMARY

The present disclosure has been made to solve the above-mentioned problems occurring in the prior art while advantages achieved by the prior art are maintained intact.

An aspect of the present disclosure provides a telematics service system and method that selects and sets an optimal communication protocol suitable for data transmission between a telematics server and a vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a telematics service system includes a telematics server connected to a service providing server and a telematics gateway over a network. The telematics server is configured to transmit or receive data to or from a vehicle through the telematics gateway, to select a recommendation protocol capable of being used to transmit or receive the data based on at least one of a type of the data flowing in from the service providing server or a throughput rate, and to determine a final protocol of the recommendation protocol through a handshake with the vehicle.

The telematics server sets a first data level in consideration of at least one of whether the data flowing in from the service providing server is streaming data, whether the data is large data, or whether the data is received from a heavy traffic link.

The telematics server sets a first abruption flag based on whether an inflow of the data is unstable.

The telematics server measures an amount of the flowing data to calculate the throughput rate and an amount of change in the throughput rate and sets a second data level and a second abruption flag in consideration of the calculated throughput rate and the calculated amount of change in the throughput rate.

The telematics server maps the first data level and the second data level to a predefined lookup table to select a recommendation candidate protocol.

The telematics server selects a predefined reliable protocol as the recommendation candidate protocol, when at least one of the first abruption flag or the second abruption flag is set to "enable".

The telematics server determines a reliable protocol of the recommendation candidate protocol as the recommendation protocol, when two or more sources transmitting the data are present.

The telematics server determines a lightweight protocol of the recommendation candidate protocol as the recommendation protocol, when the two or more sources transmitting the data are not present.

The vehicle determines a data priority depending on the type of the data, determines a vehicle security level and a vehicle function damage level in consideration of a destination of the data and a destination function, and determines the final protocol in consideration of the data priority, the vehicle security level, and the vehicle function damage level.

The vehicle selects a protocol, of which an amount of data transfer is the greatest, from among the recommendation protocol as the final protocol based on the vehicle security level and the vehicle function damage level with reference to a protocol determination map.

According to another aspect of the present disclosure, in a telematics service system including a telematics server connected to a service providing server and a telematics gateway over a network and a vehicle connected to the telematics gateway, a telematics service method includes receiving, by the telematics server, data flowing in from the service providing server, selecting, by the telematics server, a recommendation protocol capable of being used to transmit or receive the data, based on at least one of a type of the flowing data or a throughput rate, and determining, by the telematics server, a final protocol among the recommendation protocol through a handshake with the vehicle.

The selecting of the recommendation protocol includes setting a first data level in consideration of at least one of whether the flowing data is streaming data, whether the data is large data, or whether the data is received from a heavy traffic link, measuring an amount of data flowing to the telematics server to calculate the throughput rate and an amount of change in the throughput rate and setting a second data level in consideration of the calculated throughput rate and the calculated amount of change in the throughput rate, mapping the first data level and the second data level to a predefined lookup table to select a recommendation candidate protocol, and determining the recommendation protocol of the recommendation candidate protocol depending on whether two or more valid sources transmitting the data are present.

The setting of the first data level includes setting, by the telematics server, a first abruption flag depending on whether an inflow of the data is unstable.

The setting of the second data level includes setting, by the telematics server, a second abruption flag in consideration of the throughput rate and the amount of change in the throughput rate.

The select of the recommendation candidate protocol includes selecting a predefined reliable protocol as the recommendation candidate protocol, when at least one of the first abruption flag or the second abruption flag is set to "enable".

The determining of the recommendation protocol includes determining a reliable protocol of the recommendation candidate protocol as the recommendation protocol, when the two or more valid sources are present.

The determining of the recommendation protocol includes determining a lightweight protocol of the recommendation candidate protocol as the recommendation protocol, when the two or more valid sources are not present.

The determining of the final protocol includes determining, by the vehicle, a data priority depending on the type of the data, determining, the vehicle, a vehicle security level and a vehicle function damage level in consideration of a destination of the data and a destination function, selecting, the vehicle, the final protocol in consideration of the data priority, the vehicle security level, and the vehicle function damage level, and notifying, by the vehicle, the telematics server of the final protocol.

The selecting of the final protocol includes selecting a protocol, of which an amount of data transfer is the greatest, from among the recommendation protocol as the final protocol based on the vehicle security level and the vehicle function damage level with reference to a protocol determination map.

After the determining of the final protocol, the method further includes instructing, by the telematics server, the telematics gateway to set the final protocol, establishing, by the telematics server, a communication path with the vehicle based on the set final protocol, and transmitting and receiving, by the telematics server, the data to or from the vehicle through the communication path.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
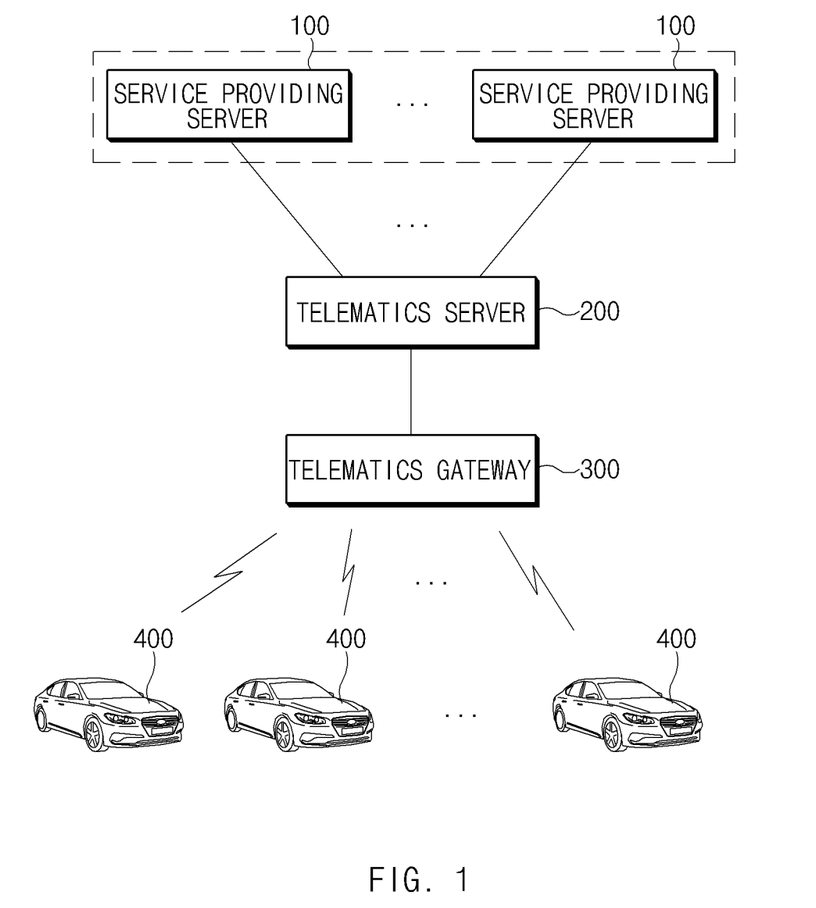
FIG. 1 is a configuration diagram schematically illustrating a telematics service system, according to an exemplary embodiment of the present disclosure.

FIG. 1 is a configuration diagram schematically illustrating a telematics service system, according to an exemplary embodiment of the present disclosure.

Referring to FIG. 1, the telematics service system includes a service providing server 100, a telematics server 200, a telematics gateway 300, and a vehicle 400.

The service providing server 100 provides an external platform with a specific service, that is, content. The content may be one of applications such as vehicle remote control, music streaming, video streaming, point of Interest (POI), weather information and/or traffic information.

The telematics server 200 receives a data packet associated with the content provided from the service providing server 100. The telematics server 200 identifies data type by analyzing the received data packet. The telematics server 200 calculates the data throughput rate by measuring the amount of the received data packet. The telematics server 200 selects at least one protocol capable of being used to transmit or receive data, in consideration of at least one of the data type or the data throughput rate. The telematics server 200 determines (selects) an optimal communication protocol for transmitting/receiving data among at least one protocol selected through a handshake with the vehicle 400, in the selected at least one protocol. In telecommunications, a handshake embodies an automated process of negotiation between two communicating in between participants through the exchange of information that establishes the protocols of a communication link at the start of the communication, before full communication begins. Herein, the communication protocol refers to a communication rule used to transmit or receive data. The telematics server 200 transmits the data packet, using the determined optimal communication protocol (hereinafter, referred to as "protocol").

The telematics gateway 300 relays the telematics server 200 and the vehicle 400. The telematics gateway 300 sets the selected protocol between the telematics server 200 and the vehicle 400. The telematics gateway 300 converts the data packet received from the telematics server 200 into the selected protocol form to transmit the converted result to the vehicle 400. Furthermore, the telematics gateway 300 may convert the data packet received from the vehicle 400 into the selected protocol form to transmit the converted result to the telematics server 200.

The vehicle 400 may determine and set the protocol to be used to transmit or receive data, through the handshake with the telematics server 200. The vehicle 400 selects one protocol from a recommendation protocol list received from the telematics server 200 to notify (transmit) the telematics server 200 of the result of determining a protocol. The vehicle 400 finally determines the protocol depending on the response of the telematics server 200 to the notification of the result of determining a protocol and sets data transmission/reception path (communication path) between each other, based on the final determined protocol.

Figure 2:
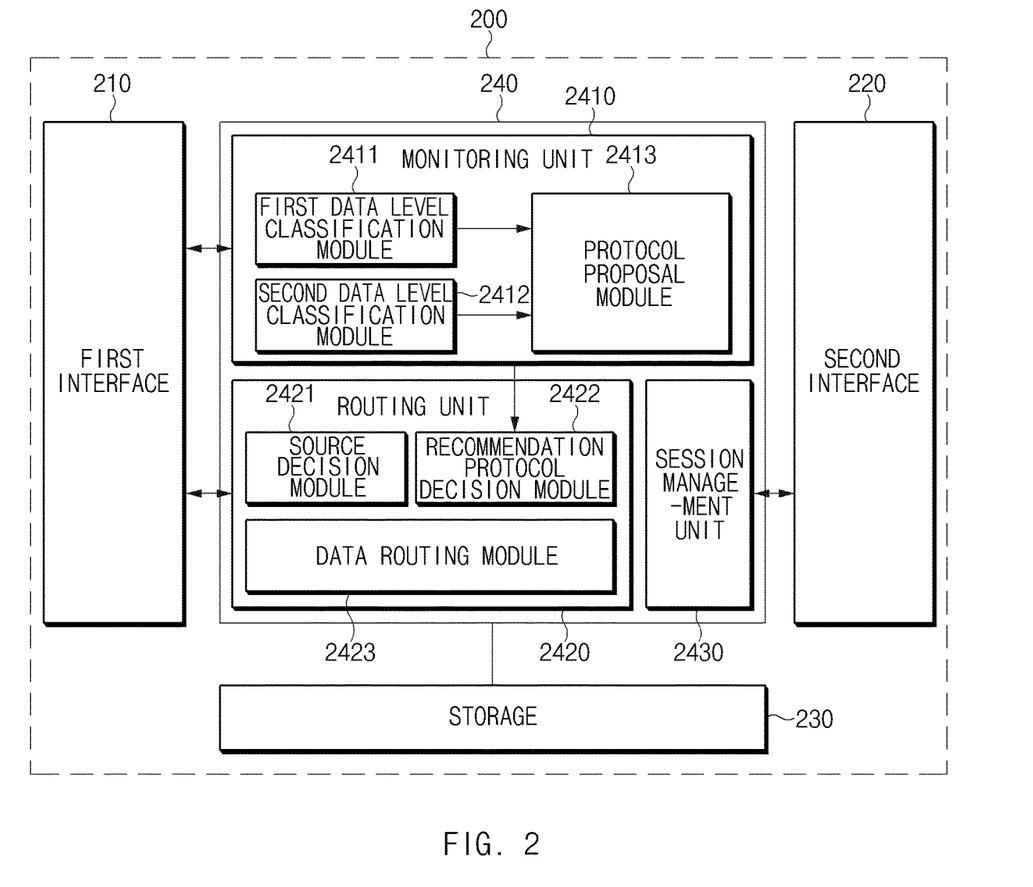
FIG. 2 is a block diagram of the telematics server, according to an exemplary embodiment of the present disclosure.
Figure 3A:
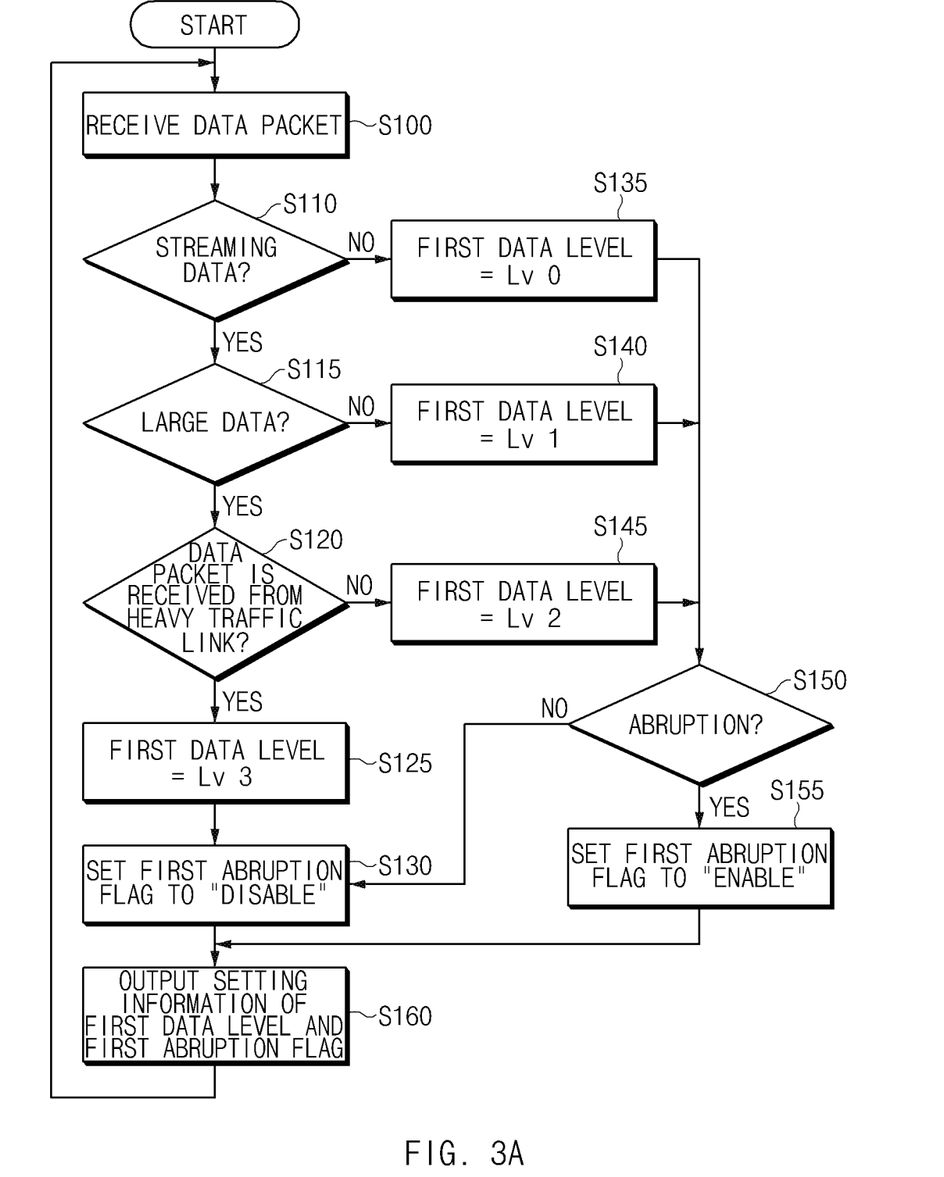
FIG. 3A is a view for describing an operation of a first data level classification module illustrated in FIG. 2.
Figure 3B:
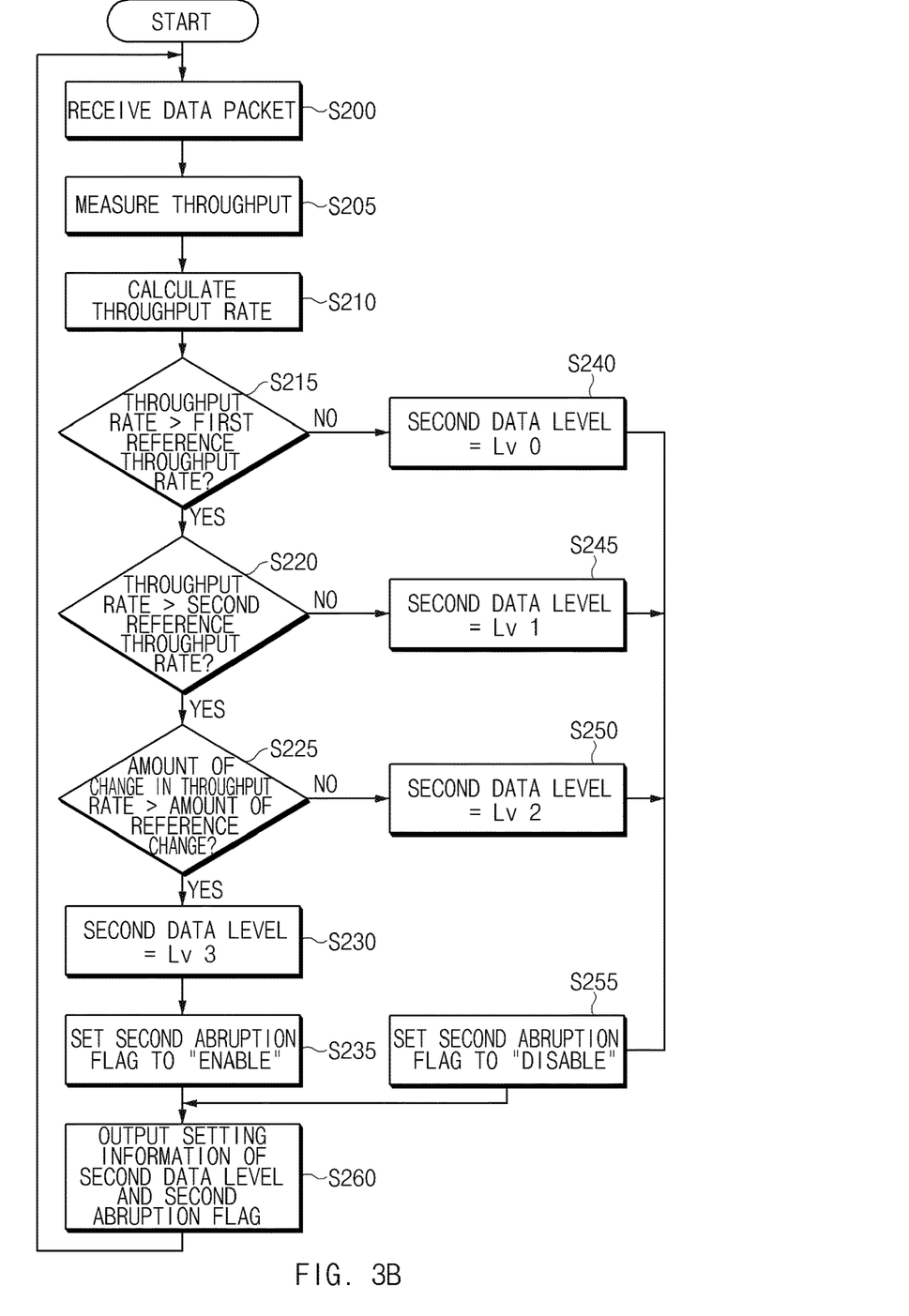
FIG. 3B is a view for describing an operation of a second data level classification module illustrated in FIG. 2.
Figure 3C:
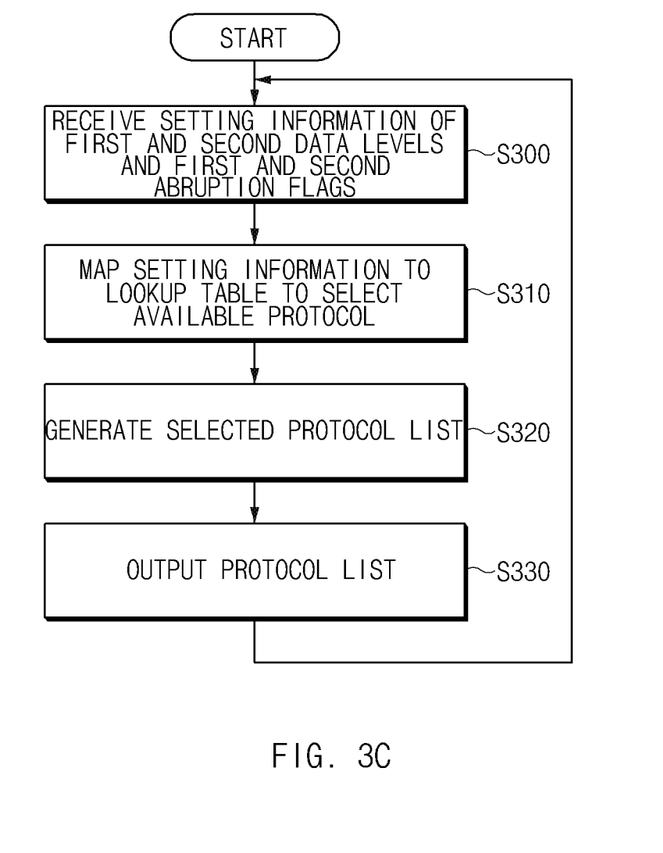
FIG. 3C is a view for describing an operation of a protocol proposal module illustrated in FIG. 2.
Figure 4:
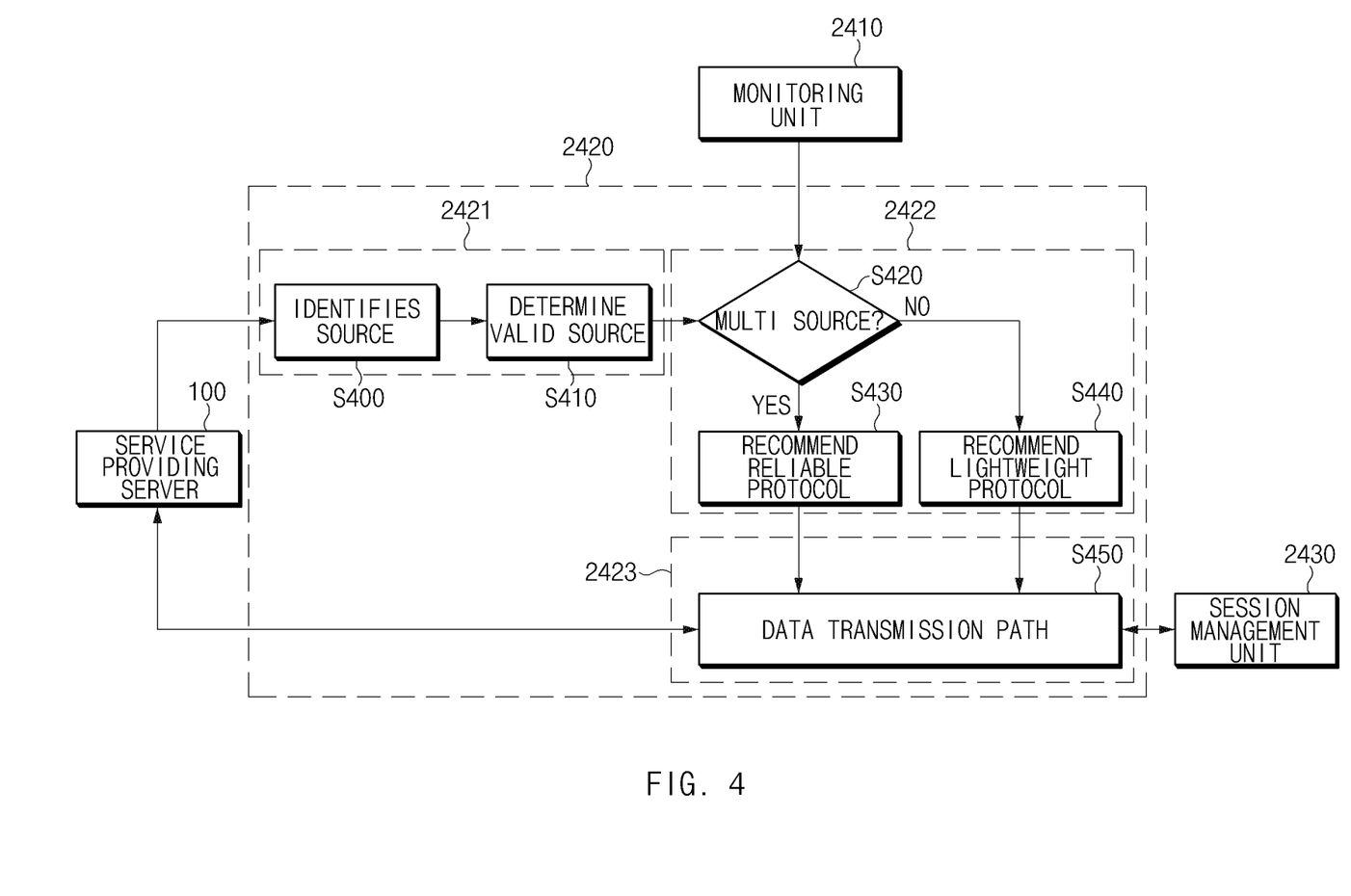
FIG. 4 is a view for describing a configuration and an operation of a routing device illustrated in FIG. 2.

FIG. 2 is a block diagram of the telematics server 200, according to an exemplary embodiment of the present disclosure. FIG. 3A is a view for describing an operation of a first data level classification module 2411 illustrated in FIG. 2. FIG. 3B is a view for describing an operation of a second data level classification module 2412 illustrated in FIG. 2. FIG. 3C is a view for describing an operation of a protocol proposal module 2413 illustrated in FIG. 2. FIG. 4 is a view for describing a configuration and an operation of a routing unit 2420 illustrated in FIG. 2.

As illustrated in FIG. 2, the telematics server 200 includes a first interface 210, a processor 240, storage 230, and a second interface 220.

The first interface 210 may be connected to the service providing server 100 so as to receive data packet (data) transmitted from the service providing server 100; alternatively, the first interface 210 may allow the data within the telematics server 200 to be transmitted to the service providing server 100.

The second interface 220 may be connected to the telematics gateway 300 to transmit data within the telematics server 200 to the telematics gateway 300 or to receive data from the telematics gateway 300.

The storage 230 may store software programmed such that the processor 240 performs a specified operation. The storage 230 may store various setting information and input and/or output data. The storage 230 may store the data transmitted from the first interface 210 and/or the second interface 220. The storage 230 may be implemented with at least one or more storage media (recording media) among a flash memory, a hard disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a removable disc, web storage, and the like.

The processor 240 controls overall operations of the telematics server 200. The processor 240 may be implemented with at least one or more of an Application Specific Integrated Circuit (ASIC), a Digital Signal Processor (DSP), a Programmable Logic Devices (PLD), Field Programmable Gate Arrays (FPGAs), a Central Processing Unit (CPU), microcontrollers, and microprocessors.

The processor 240 may include a monitoring unit 2410, a routing unit 2420, and a session management unit 2430, or the like.

The monitoring unit 2410 receives the data transmitted from the service providing server 100 through the first interface 210 and analyzes the received data to suggest a protocol capable of being used to transmit or receive the corresponding data. The monitoring unit 2410 includes a first data level classification module 2411, a second data level classification module 2412, and a protocol proposal module 2413.

The first data level classification module 2411 analyzes (checks) header information, a payload, or the like of the data packet that flows in through the first interface 210. The first data level classification module 2411 classifies the data type of the data packet, which flows in the telematics server 200, and sets the security level (hereinafter, referred to as a "first data level") of data depending on the classified data type.

Hereinafter, the operation of the first data level classification module 2411 will be described with reference to FIG. 3A.

Referring to FIG. 3A, in S100, the first data level classification module 2411 receives the data packet flowing in through the first interface 210. In S110, the first data level classification module 2411 determines whether the payload in the data packet is streaming data. In S135, the first data level classification module 2411 sets (determines) the first data level to 'level 0 (Lv 0)', when the payload is not streaming data.

In S115, the first data level classification module 2411 determines whether the payload is large data, when the payload in the data packet is streaming data in S110. In S140, the first data level classification module 2411 sets the first data level to 'level 1 (Lv 1)', when the payload is not large data.

In S120, the first data level classification module 2411 determines whether the data packet is received from a heavy traffic link, when it is determined in S115 that the payload is streaming data. The first data level classification module 2411 determines that the data packet is received from the heavy traffic link, when the link receiving the data packet is present in the predefined heavy traffic link list. In S145, the first data level classification module 2411 sets the first data level to 'level 2 (Lv 2)', when the data packet is not received from the heavy traffic link.

In S125, the first data level classification module 2411 sets the first data level to 'level 3 (Lv 3)', when it is determined in S120 that the data packet is received from the heavy traffic link. Furthermore, in S130, the first data level classification module 2411 sets a first abruption flag to "disable".

In S150, the first data level classification module 2411 determines whether the inflow of the data packet is capable of being suddenly interrupted, after S135, S140, or S145. In other words, the first data level classification module 2411 determines whether the inflow of the data packet is in an unstable state. In S130, the first data level classification module 2411 sets the first abruption flag to "disable" when the inflow of the data packet is not in the unstable state; in S155, the first data level classification module 2411 sets the first abruption flag to "enable" when the inflow of the data packet is in the unstable state.

In S160, the first data level classification module 2411 outputs setting information to the protocol proposal module 2413, when the first data level and the first abruption flag with respect to the flowing data packet are set.

The second data level classification module 2412 measures data throughput rate ([bps] or [bits/sec]) and determines the security level (i.e., a second data level) and the second abruption flag of the flowing data based on the measured data throughput rate. In detail, the operation of the second data level classification module 2412 will be described with reference to FIG. 3B.

Referring to FIG. 3B, in S200, the second data level classification module 2412 receives data packet flowing in through the first interface 210; in S205, the second data level classification module 2412 measures the amount of the received data packet, that is, throughput. In S210, the second data level classification module 2412 calculates the data throughput rate (hereinafter, referred to as "throughput rate"), based on the determined unit time (time window) and the measured throughput.

Afterward, in S215, the second data level classification module 2412 determines whether the calculated throughput rate exceeds a first reference throughput rate. In S240, the second data level classification module 2412 determines (sets) the second data level to 'level 0', when the calculated throughput rate does not exceed the first reference throughput rate.

In S220, the second data level classification module 2412 determines whether the calculated throughput rate exceeds a second reference throughput rate, when the calculated throughput rate exceeds the first reference throughput rate. In S245, the second data level classification module 2412 sets the second data level to 'level 1', when the calculated throughput rate is not greater than the second reference throughput rate.

In S225, the second data level classification module 2412 determines whether the amount of change in the throughput rate exceeds the amount of reference change, when the calculated throughput rate exceeds the second reference throughput rate. The second data level classification module 2412 computes the amount of change of the throughput rate (i.e., a throughput rate variance) calculated as compared with the previously calculated throughput rate. In S250, the second data level classification module 2412 sets the second data level to 'level 2', when the amount of change in the throughput rate does not exceed the amount of reference change.

In S230, the second data level classification module 2412 sets the second data level to 'level 3', when the amount of change in the throughput rate exceeds the amount of reference change. Moreover, in S235, the second data level classification module 2412 sets the second abruption flag to "enable".

In the meantime, in S255, the second data level classification module 2412 sets the second abruption flag to "disable" after S240, S245, or S250.

In S260, the second data level classification module 2412 outputs setting information to the protocol proposal module 2413, when the settings of the second data level and the second abruption flag are completed.

The protocol proposal module 2413 suggests a protocol (recommendation candidate protocol) capable of being used to transmit or receive flowing data, based on the setting information output from the first data level classification module 2411 and the second data level classification module 2412. Referring to FIG. 3C, in S300, the protocol proposal module 2413 receives the setting information of the first data level and the first abruption flag and the setting information of the second data level and the second abruption flag, which are output from the first data level classification module 2411 and the second data level classification module 2412. In S310, the protocol proposal module 2413 selects an available protocol based on the setting information of the first data level and the first abruption flag and the setting information of the second data level and the second abruption flag. In other words, the protocol proposal module 2413 maps setting information of the first data level and the second data level to the lookup table stored in the storage 230 to select at least one available protocol. The lookup table includes information defining the available protocol according to the first data level and the second data level. The protocol proposal module 2413 may select an unconditionally reliable protocol as the available protocol, when the first abruption flag and the second abruption flag are set to "enable". In S320, the protocol proposal module 2413 generates a recommendation candidate protocol list based on the selected available protocol. In S330, the protocol proposal module 2413 outputs the generated recommendation candidate protocol list. The protocol proposal module 2413 labels the generated recommendation candidate protocol list in the flowing data packet (data) to output the labeled result to the routing unit 2420. The protocol proposal module 2413 may transmit the labeled data packet when transmitting a request message to the routing unit 2420.

The routing unit 2420 includes a source decision module 2421, a recommendation protocol decision module 2422, and a data routing module 2423. Referring to FIG. 4, in S400, the source decision module 2421 determines whether the source transmitting the flowing data packet is a reliable source. The source decision module 2421 may search for the source of the data packet in the reliable source database (DB) pre-stored in the storage 230. The source decision module 2421 determines that the corresponding source is reliable, when the source transmitting the flowing data packet (inflow data) is present in the reliable source DB. In S410, the source decision module 2421 determines that the corresponding source is a valid source, when the source of the data packet is the reliable source. The source decision module 2421 extract the at least one reliable service providing server 100 among the service providing servers 100 providing the same data (flowing data packet) to determine that the extracted at least one reliable service providing server 100 is the valid source. The source decision module 2421 generates a valid source list to output the valid source list to the recommendation protocol decision module 2422. The source decision module 2421 may identify the communication platform type of the source. Herein, the communication platform type may be divided into two-way communication platform and one-way communication platform.

The recommendation protocol decision module 2422 determines at least one recommendation protocol based on the recommendation candidate protocol list received from the monitoring unit 2410 and the number of valid sources received from the source decision module 2421. In S420, the recommendation protocol decision module 2422 determines whether the valid source is a multi-source. That is, the recommendation protocol decision module 2422 determines whether two or more reliable sources are present. In S430, the recommendation protocol decision module 2422 determines that a reliable protocol in the recommendation candidate protocol list received from the monitoring unit 2410 is a recommendation protocol, when the valid source is a multi-source. In the meantime, in S440, the recommendation protocol decision module 2422 determines that a lightweight protocol in the recommendation candidate protocol list received from the monitoring unit 2410 is the recommendation protocol, when the valid source is not a multi-source. In other words, the recommendation protocol decision module 2422 recommends a reliable protocol in the recommendation candidate protocol list received from the monitoring unit 2410 when two or more valid sources are present; the recommendation protocol decision module 2422 recommends a lightweight protocol in the recommendation candidate protocol list received from the monitoring unit 2410 when two or more valid sources are not present. Herein, Hypertext Transfer Protocol (HTTP), Transmission Control Protocol (TCP), Real-time Transport Protocol (RTP), Short Message Service (SMS) Gateway, and the like may be used as the reliable protocol; Message Queueing Telemetry Transport (MQTT), Constrained Application Protocol (CoAP), User Datagram Protocol (UDP), SMS gateway, and the like may be used as the lightweight protocol. The recommendation protocol decision module 2422 generates a recommendation protocol list based on the result of determining the recommendation protocol to transmit (forward) the recommendation protocol list to the data routing module 2423.

In S450, the data routing module 2423 sets a data transmission path for transmitting/receiving data. The data routing module 2423 transmits the recommendation protocol list through the data transmission path.

The session management unit 2430 manages the session between the telematics server 200 and the vehicle 400. In other words, the session management unit 2430 manages data transmission path(s) set (generated) by the data routing module 2423 of the routing unit 2420.

Figure 5:
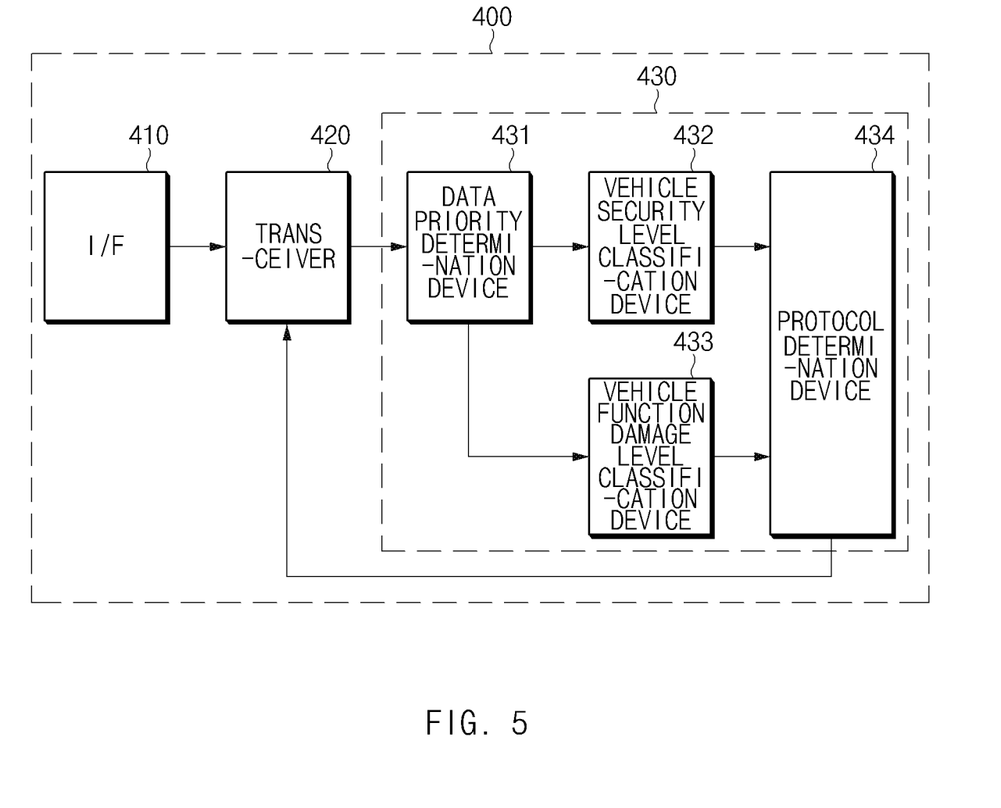
FIG. 5 is a block diagram illustrating a vehicle, according to an exemplary embodiment of the present disclosure.
Figure 6:
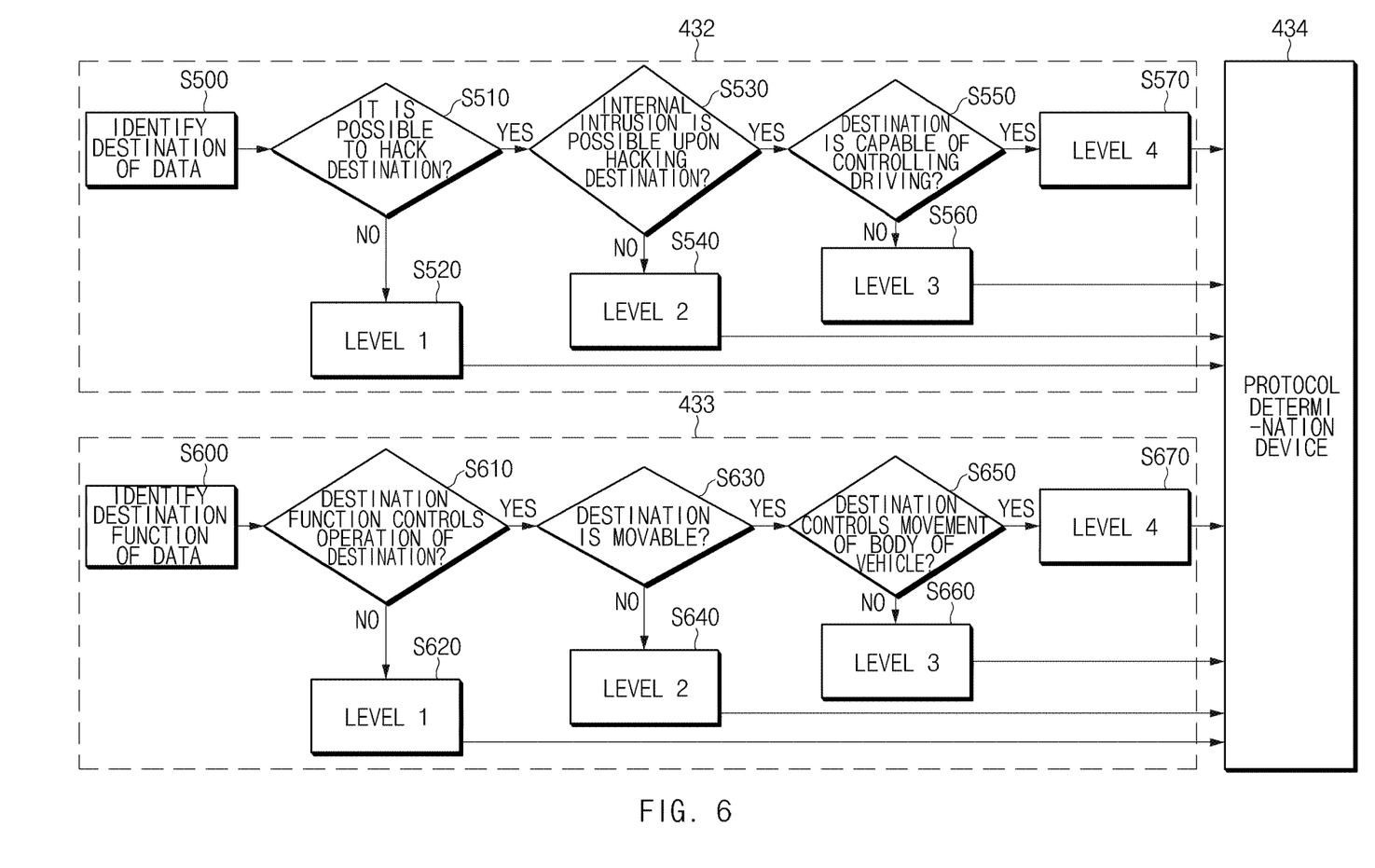
FIG. 6 is a view for describing a configuration and an operation of a processor illustrated in FIG. 5.

FIG. 5 is a block diagram illustrating the vehicle 400, according to an exemplary embodiment of the present disclosure. FIG. 6 is a view for describing a configuration and an operation of the processor 430 illustrated in FIG. 5.

As illustrated in FIG. 5, the vehicle 400 includes an interface 410, a transceiver 420, and a processor 430

The interface 410 is a medium that enables the communication between the telematics gateway 300 and the vehicle 400. The interface 410 forwards the data transmitted from the telematics gateway 300, to the vehicle 400 or transmits the data transmitted from the vehicle 400, to the telematics gateway 300.

The transceiver 420 may allow the vehicle 400 to receive data from the outside or to transmit data to the outside. The transceiver 420 may receive data information and a recommendation protocol list, which are transmitted from the telematics server 200, through the interface 410.

The processor 430 controls the data communication operation of the vehicle 400. The processor 430 may be implemented with at least one or more of an Application Specific Integrated Circuit (ASIC), a Digital Signal Processor (DSP), a Programmable Logic Devices (PLD), Field Programmable Gate Arrays (FPGAs), a Central Processing Unit (CPU), microcontrollers, and microprocessors. The processor 430 includes a data priority determination device 431, a vehicle security level classification device 432, a vehicle function damage level classification device 433, and a protocol determination device 434.

The data priority determination device 431 identifies the data type based on the data information and determines a data priority depending on the data type. The data priority determination device 431 maps the identified data type to the lookup table pre-stored in a memory (not illustrated) to determine the data priority. As illustrated in Table 1, the lookup table includes information in which the priority according to the data type is defined. For example, the data priority determination device 431 determines that the data type is emergency data to determine the priority to be the highest, when the data type is a vehicle control command.

TABLE 1

| Priority | | Data type |
|---|---|---|
| (Normal) | 1 | Entertainment content (e.g., music streaming) |
| ↓ | 2 | Information (e.g., weather information) associated with a driver/passenger |
| (Emergency) | 3 | Command (e.g., POI) associated with a driver |
| | 4 | Vehicle control command (e.g., Remote Start) |

The vehicle security level classification device 432 performs classification depending on the intrusion and control from the outside to the inside of a vehicle. Referring to FIG. 6, in S500, the vehicle security level classification device 432 identifies data destination (hereinafter referred to as "destination") through data information. Herein, the destination may be software or hardware mounted in the vehicle 400. In S510, the vehicle security level classification device 432 determines whether it is possible to hack the destination. In S520, the vehicle security level classification device 432 determines that the vehicle security level is 'level 1', when it is impossible to hack the destination. In S530, the vehicle security level classification device 432 determines whether an internal intrusion is possible upon hacking the destination, when it is possible to hack the destination. In other words, the vehicle security level classification device 432 determines whether the intrusion to a network in the vehicle is possible, when the destination is hacked. In S540, the vehicle security level classification device 432 determines that the vehicle security level is 'level 2', when the internal intrusion is impossible upon hacking the destination. In S550, the vehicle security level classification device 432 determines whether the destination is capable of controlling the driving of a vehicle, when the internal intrusion is possible upon hacking the destination. In S560, the vehicle security level classification device 432 determines that the vehicle security level is 'level 3', when the destination is not capable of controlling the driving of the vehicle. In S570, the vehicle security level classification device 432 determines that the vehicle security level is 'level 4', when the destination is capable of controlling the driving of the vehicle. The vehicle function damage level classification device 433 determines a damage level at which the function of the destination is damaged when the destination is hacked. Referring to FIG. 6, in S600, the vehicle function damage level classification device 433 identifies the destination function of data based on the data information. In S610, the vehicle function damage level classification device 433 determines whether the destination function is capable of controlling the operation (manipulation) of the destination. In S620, the vehicle function damage level classification device 433 determines that the vehicle function damage level is 'level 1', when the destination function is not capable of controlling the operation of the destination. In S630, the vehicle function damage level classification device 433 determines whether the destination is movable, when the destination function is capable of controlling the operation of the destination. For example, the vehicle function damage level classification device 433 may determine that the destination is movable, because a trunk is opened or closed depending on the operation control of the trunk when the destination is the trunk.

In S640, the vehicle function damage level classification device 433 determines that the vehicle function damage level is 'level 2', when the destination is not movable. In S650, the vehicle function damage level classification device 433 determines whether the destination is capable of controlling the movement of the body of a vehicle. For example, the vehicle function damage level classification device 433 determines that the destination is capable of controlling the movement of the body of the vehicle, when the destination is a wheel. In S660, the vehicle function damage level classification device 433 determines that the vehicle function damage level is 'level 3', when the destination is not capable of controlling the movement of the body of the vehicle. In S670, the vehicle function damage level classification device 433 determines that the vehicle function damage level is 'level 4', when the destination is capable of controlling the movement of the body of the vehicle.

The protocol determination device 434 finally determines the protocol, based on the vehicle security level and the vehicle function damage level. For example, the protocol determination device 434 determines the total level as 'level 6', by summing the vehicle security level and the vehicle function damage level, when TCP, HTTP, and RTP are present in the recommendation protocol list received from the telematics server 200 and when each of the vehicle security level and the vehicle function damage level is 'level 3'. The protocol determination device 434 determines the protocol matched to the determined total level with reference to the pre-stored protocol determination map. At this time, a protocol may be selected in order in which the amount of data transfer is great, when two or more protocols are present at the same level. The protocol determination device 434 finally selects TCP of TCP, HTTP, and RTP, when the protocol determination map is illustrated in Table 2 below.

TABLE 2

| Level 2 | Level 3 | Level 4 | Level 5 | Level 6 | Level 7 | Level 8 |
|---------|---------|---------|---------|---------|---------|---------|
| TCPRTP  | TCP     | TCP     | TCP     | TCP     | SMS     | SMS     |
| UDP     | RTP     | UDP     | HTTP    | SMS     |         |         |
| HTTP    | UDP     | HTTP    | MQTT    |         |         |         |
| MQTT    | HTTP    | MQTT    | SMS     |         |         |         |
| COAP    | MQTT    | SMS     |         |         |         |         |
| SMS     | SMS     |         |         |         |         |         |

For another example, the protocol determination device 434 determines the total level as 'level 5' by summing the vehicle security level and the vehicle function damage level, when HTTP, MQTT, RTP, and SMS are present in the recommendation protocol list and when the vehicle security level and the vehicle function damage level are 'level 3' and 'level 2', respectively; the protocol determination device 434 determines HTTP, in which the amount of data transfer is the greatest, from among protocols, in which the protocol in 'level 5' is the same as the protocol in the recommendation protocol list, as the final protocol with reference to the protocol determination map in Table 2. The processor 430 of the vehicle 400 notifies the telematics server 200 of the protocol determination result, when the final protocol is determined. Afterward, the telematics server 200 and the vehicle 400 sets the finally determined protocol to transmit or receive data between each other and establishes the connection of communication channel (communication path) based on the set protocol. Afterward, the vehicle 400 may transmit or receive data to or from the service providing server 100 through the connected communication channel.

Figure 7:
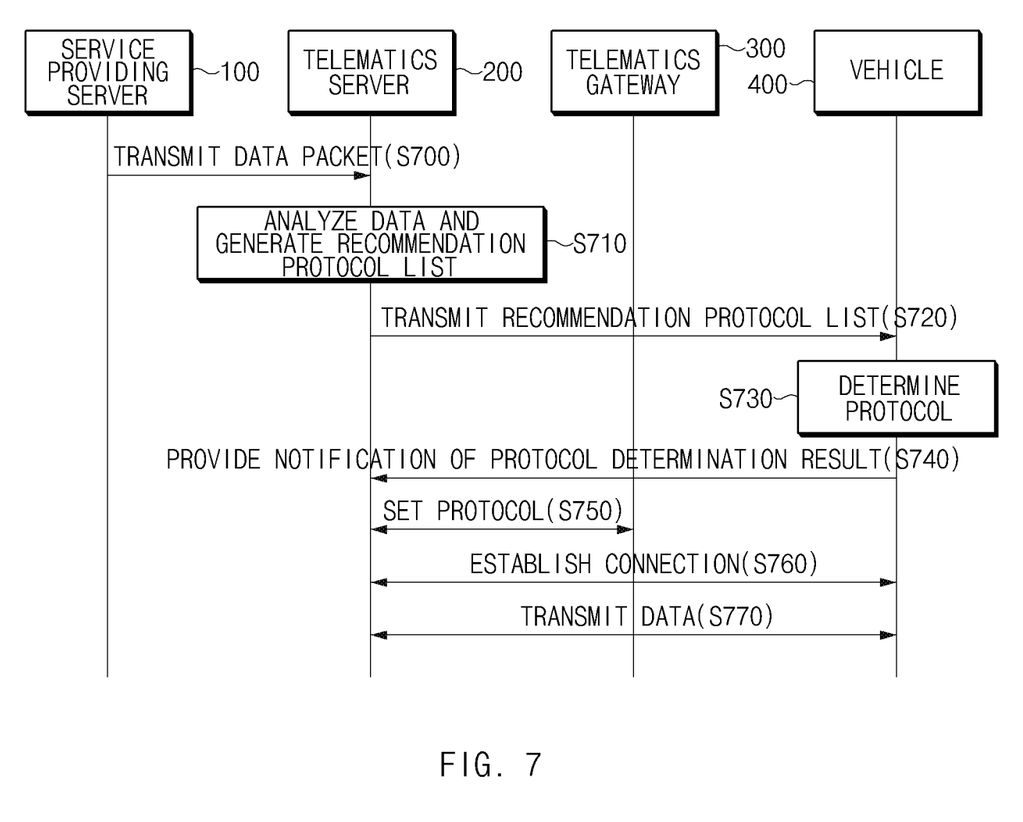
FIG. 7 is a flowchart illustrating a telematics service method, according to an exemplary embodiment of the present disclosure.

FIG. 7 is a flowchart illustrating a telematics service method, according to an exemplary embodiment of the present disclosure.

Referring to FIG. 7, in S700, the service providing server 100 transmits a data packet. For example, the data packet may be a vehicle control command, a streaming data, or the like.

In S710, the telematics server 200 analyzes data within the data packet and generates a recommendation protocol list based on the analyzed result. The telematics server 200 selects a protocol (i.e., a recommendation candidate protocol) capable of being used to transmit or receive data, in consideration of a data type and a data throughput rate. The telematics server 200 selects a recommendation protocol among recommendation candidate protocols based on the number of valid sources transmitting data. For example, the telematics server 200 may recommend MQTT, UDP, and SMS gateway when data is a short message, when the data throughput rate is low, and when the one-way communication from the service providing server 100 to the vehicle 400 is considered. Alternatively, the telematics server 200 may recommend UDP as the data transmission protocol of the service providing server 100, i.e., a protocol capable of being used for the service providing server 100 to transmit data to the vehicle 400 and may recommend HTTP and TCP as the data transmission protocol of the vehicle 400, i.e., a protocol capable of being used for the vehicle 400 to transmit data to the service providing server 100, when data is streaming data, when the data throughput rate is high, and when the two-way communication between the service providing server 100 and the vehicle 400 is considered.

In S720, the telematics server 200 generates a recommendation protocol list to transmit the recommendation protocol list to the vehicle 400 when the protocol to be recommended is determined. The telematics server 200 transmits information (i.e., data information) about data transmitted from the service providing server 100 together with the recommendation protocol list.

In S730, the vehicle 400 determines the protocol to be used to transmit or receive data, in the recommendation protocol list. At this time, the vehicle 400 may set at least one of the protocol for transmitting data or the protocol for receiving data. For example, the vehicle 400 sets the data priority to '4', when the data transmitted from the service providing server 100 is a vehicle control command; the vehicle 400 determines the vehicle security level as 'level 2', when it is impossible to invade the inside of the vehicle upon hacking the data destination; the vehicle 400 determines the vehicle function damage level as 'level 2', when the data destination is not movable. That is, because the vehicle 400 determines that the data transmitted from the service providing server 100 is the target to be processed urgently and the total level of the vehicle security level and the vehicle function damage level is 'level 4', the vehicle 400 finally selects UDP among recommendation protocols MQTT, UDP and SMS gateway. For another example, the vehicle 400 determines the data priority as '1', when the data transmitted from the service providing server 100 is streaming data, i.e., entertainment; the vehicle 400 determines that each of the vehicle security level and the vehicle function damage level is 'level 1', when it is impossible to hack the data destination and when it is impossible to control the operation of the destination. The vehicle 400 determines that the data transmitted from the service providing server 100 is the target to be processed in the last priority, selects the recommendation protocol UDP for receiving data as the final protocol for receiving data because the total level of the vehicle security level and the vehicle function damage level is 'level 2', and selects TCP, in which the amount of data transfer is relatively great, from among recommendation protocols HTTP and TCP for transmitting data as the final protocol for transmitting data.

In S740, the vehicle 400 notifies the telematics server 200 of the protocol determination result, when the final protocol is determined. The vehicle 400 transmits, to the telematics server 200, a protocol determination result including at least one of the finally selected protocol for transmitting data or the finally selected protocol for receiving data.

Afterward, in S750, the telematics server 200 may allow the telematics gateway 300 to set a protocol based on the protocol determination result and then to set the protocol. The telematics gateway 300 performs protocol settings depending on the instruction of the telematics server 200.

In S760, the telematics server 200 and the vehicle 400 establishes (generates) the communication path connection for transmitting or receiving data between each other. In S770, the telematics server 200 and the vehicle 400 transmit data between each other, when the communication path connection is established, In other words, the telematics server 200 may transmit the data transmitted from the service providing server 100 to the vehicle 400 or may transmit the data transmitted from the vehicle 400 to the service providing server 100.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to an exemplary embodiment of the present disclosure, it is possible to provide various services through the connection between a vehicle and an external platform and to improve the efficiency of data transmission, by selecting and setting an optimal protocol suitable for data transmission between a telematics server and a vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A telematics service system, the system comprising a telematics server connected to a service providing server and a telematics gateway over a network,
wherein the telematics server is configured to:
transmit or receive data to or from a vehicle through the telematics gateway;
measure an amount of the data flowing in from the service providing server;
calculate a data throughput rate and an amount of change in the data throughput rate based on the amount of the data flowing in;
determine a first data level in consideration of a type of the data flowing in;
determine a second data level in consideration of the calculated data throughput rate and the calculated amount of change in the data throughput rate;
select at least one recommendation protocol capable of being used to transmit or receive the data, based on the first data level and the second data level; and
determine a final protocol of the at least one recommendation protocol, through a handshake with the vehicle.

2. The system of claim 1, wherein the telematics server sets the first data level in consideration of at least one of whether the data flowing in from the service providing server is streaming data, whether the data is large data, or whether the data is received from a heavy traffic link.

3. The system of claim 2, wherein the telematics server sets a first abruption flag based on whether an inflow of the data is unstable.

4. The system of claim 3, wherein the telematics server further sets a second abruption flag in consideration of the calculated data throughput rate and the calculated amount of change in the data throughput rate.

5. The system of claim 4, wherein the telematics server maps the first data level and the second data level to a predefined lookup table to select a recommendation candidate protocol.

6. The system of claim 5, wherein the telematics server selects a predefined reliable protocol as the recommendation candidate protocol when at least one of the first abruption flag or the second abruption flag is set to "enable".

7. The system of claim 6, wherein the telematics server determines a reliable protocol of the recommendation candidate protocol as the at least one recommendation protocol when two or more sources transmitting the data are present.

8. The system of claim 7, wherein the telematics server determines a lightweight protocol of the recommendation candidate protocol as the at least one recommendation protocol when the two or more sources transmitting the data are not present.

9. The system of claim 1, wherein the vehicle determines a data priority depending on the type of the data, determines a vehicle security level and a vehicle function damage level in consideration of a destination of the data and a destination function, and determines the final protocol in consideration of the data priority, the vehicle security level, and the vehicle function damage level.

10. The system of claim 9, wherein the vehicle selects a protocol, of which an amount of data transfer is the greatest, from among the at least one recommendation protocol as the final protocol based on the vehicle security level and the vehicle function damage level with reference to a protocol determination map.

11. A telematics service method in a telematics service system including a telematics server connected to a service providing server and a telematics gateway over a network and a vehicle connected to the telematics gateway, the method comprising:
receiving, by the telematics server, data flowing in from the service providing server;
measuring, by the telematics server, an amount of the data flowing in;
calculating, by the telematics server, a data throughput rate and an amount of change in the data throughput rate based on the amount of the data flowing in;
determining a first data level in consideration of a type of the data flowing in;
determining a second data level in consideration of the calculated data throughput rate and the calculated amount of change in the data throughput rate;

selecting, by the telematics server, at least one recommendation protocol capable of being used to transmit or receive the data, based on the first data level and the second data level; and determining, by the telematics server, a final protocol among the at least one recommendation protocol through a handshake with the vehicle.

12. The method of claim 11, wherein the selecting at least one recommendation protocol includes:

setting the first data level in consideration of at least one of whether the data flowing in is streaming data, whether the data is large data, or whether the data is received from a heavy traffic link;

mapping the first data level and the second data level to a predefined lookup table to select a recommendation candidate protocol; and determining the at least one recommendation protocol of the recommendation candidate protocol depending on whether two or more valid sources transmitting the data are present.

13. The method of claim 12, wherein the setting the first data level includes setting, by the telematics server, a first abruption flag depending on whether an inflow of the data is unstable.

14. The method of claim 13, wherein the setting a second data level includes setting, by the telematics server, a second abruption flag in consideration of the data throughput rate and the amount of change in the data throughput rate.

15. The method of claim 14, wherein the mapping the first data level and the second data level includes selecting a predefined reliable protocol as the recommendation candidate protocol when at least one of the first abruption flag or the second abruption flag is set to "enable".

16. The method of claim 12, wherein the determining the at least one recommendation protocol includes determining a reliable protocol of the recommendation candidate protocol as the at least one recommendation protocol when the two or more valid sources are present.

17. The method of claim 16, wherein the determining the at least one recommendation protocol includes determining a lightweight protocol of the recommendation candidate protocol as the at least one recommendation protocol when the two or more valid sources are not present.

18. The method of claim 11, wherein the determining a final protocol includes:

determining, by the vehicle, a data priority depending on the type of the data;

determining, the vehicle, a vehicle security level and a vehicle function damage level in consideration of a destination of the data and a destination function;

selecting, the vehicle, the final protocol in consideration of the data priority, the vehicle security level, and the vehicle function damage level; and notifying, by the vehicle, the telematics server of the final protocol.

19. The method of claim 18, wherein the selecting the final protocol includes selecting a protocol, of which an amount of data transfer is the greatest, from among the at least one recommendation protocol as the final protocol based on the vehicle security level and the vehicle function damage level with reference to a protocol determination map.

20. The method of claim 11, further comprising, after the determining of the final protocol:

instructing, by the telematics server, the telematics gateway to set the final protocol;

establishing, by the telematics server, a communication path with the vehicle based on the set final protocol; and transmitting and receiving, by the telematics server, the data to or from the vehicle through the communication path.

* * * * *